(12) United States Patent
Losee (10) Patent No.: US 7,529,042 B2
(45) Date of Patent: May 5, 2009

(54) MAGNIFYING VIEWER AND PROJECTOR FOR PORTABLE ELECTRONIC DEVICES

(76) Inventor: Paul D. Losee, 2783 Hobbs Creek Dr., Layton, UT (US) 84040

( * ) Notice: Subject to any disclaimer, the term of this patent is extended or adjusted under 35 U.S.C. 154(b) by 0 days.

(21) Appl. No.: 12/021,128

(22) Filed: Jan. 28, 2008

(65) Prior Publication Data

US 2008/0180818 A1 Jul. 31, 2008

Related U.S. Application Data

(60) Provisional application No. 60/897,706, filed on Jan. 26, 2007, provisional application No. 60/922,886, filed on Apr. 11, 2007.

(51) Int. Cl.
*G02B 7/02* (2006.01)

(52) U.S. Cl. .................. 359/802; 359/804

(58) Field of Classification Search .......... 359/802–811
See application file for complete search history.

(56) References Cited

U.S. PATENT DOCUMENTS

| 4,712,870 | A | 12/1987 | Robinson et al. | 359/738 |
| 4,958,907 | A | 9/1990 | Davis | 359/809 |
| 6,052,226 | A | 4/2000 | Takahashi | 359/457 |
| 6,407,860 | B1 | 6/2002 | Funazaki et al. | 359/457 |
| 6,646,864 | B2 * | 11/2003 | Richardson | 361/681 |
| 7,277,239 | B2 * | 10/2007 | Carnevali | 359/802 |

OTHER PUBLICATIONS

Davis, Arthur et al. "P-95: Fresnel Lenses in Rear Projection Displays." *SID 01 Digest*, Rochester, NY, Jun. 2001, pp. 1-4, no date provide.

"115 Fresnel Lens Related Patents on CD." 2005 *BrainDex: The Knowledge Source*. Jan. 15, 2008, pp. 1-5. <http://www.braindex.com/products/115-FRESENEL-LENS-RELATED-PATENTS-ON-CD...>.

"Reflexite Collimating Film: RCF90CK Large Format LCD Monitor Solution." Technical Publication RDO-197, Pub. 2006, Rev. 1, Avon, CT, pp. 1-2, no date provide.

"Reflexite Collimating Film: RCF90NS Mobile Display Solution." Technical Publication RDO-198, Pub. 2007, Rev. 1, Avon, CT, pp. 1-2, no date provide.

"Optical Microstructured Surfaces." Technical Publication FOI-100, Pub., 1998, Rev. 5, Avon, CT, pp. 1-2, no date provide.

"Positive Fresnel Lenses." Technical Publication FOI-101, Pub. 1998, Rev. 10, p. 1, no date provide.

* cited by examiner

*Primary Examiner*—Mohammed Hasan
(74) *Attorney, Agent, or Firm*—Morriss O'Bryant Compagni, P.C.

(57) ABSTRACT

The invention provides a mechanical viewing structure or theater for viewing small screens associated with personal electronic devices. The viewing structure is made of four semi-rigid trapezoid shaped walls joined together to form a hollow trapezoidal viewing structure that optionally is collapsible. The viewing structure has a larger opening that is fitted with a magnifying screen and a smaller opening adapted to be placed above the screen of the personal electronic device and magnify that image for the viewer. The invention also includes a projector that may be releasably attached to the viewing structure to allow an image present on the personal electronic device to be projected onto a remote surface, such as a wall or ceiling.

20 Claims, 9 Drawing Sheets

MAGNIFYING VIEWER AND PROJECTOR FOR PORTABLE ELECTRONIC DEVICES

CROSS-REFERENCE TO RELATED APPLICATIONS

This application claims the benefit of U.S. Provisional Application No. 60/897,706, filed Jan. 26, 2007, and U.S. Provisional Application No. 60/922,886, filed Apr. 11, 2007, the entirety of both of which are incorporated by reference.

TECHNICAL FIELD

The invention relates to a viewing enhancement device for magnifying an image present on a portable electronic device and a system for projecting the image present on the portable electronic device.

BACKGROUND

Between the years 2000-2005, the portable MP3 player and the multi-functionality of cell phones and PDA devices created an explosion in the number of portable entertainment and communication devices. In 2006, the genesis of the next explosion in portable devices occurred, namely the introduction of the hand-held portable digital video device. Apple Computer is a leader in this market, launching its video IPOD® following its very successful music IPOD® product. Apple Computer is a leader in this market, launching its video IPOD® following its very successful music IPOD® product. In late 2006, Apple successfully negotiated with major entertainment companies to sell the latest releases and other movies in digital download format for use on the video IPOD® product. This move has unleashed the floodgates of consumer usage of these portable media players for the playing of movies, music videos and a full range of video content that have been previously available for other products and channels of distribution. As evidence, in the $4^{th}$ quarter of 2006 Apple sold 16 million IPOD® devices, fully half (8 million) of these devices were video capable IPODs®.

In addition, there are approximately 2.5 billion cell phones and hundreds of millions of PDA devices in use globally today. These devices are intended for personal use but in many instances it is desirable to enlarge and/or share the screen content of these personal electronic devices.

Portable media players all share a common set of viewing problems. First, the screens are small which makes it difficult to see scene detail. Second, viewing the screen is not private, in that the screen can easily be see by a person sitting next to the viewer. Third, the screen is difficult to see in bright light or daylight environments, since light may reflect off the screen and make it nearly impossible to see the screen content.

While there are several very complicated devices that may be used to view a small LCD screen, such as the IPOD®, these typically involve the use of specific data transfer cables and elaborate eye glass like presentation devices designed to project the image to the wearer. Unfortunately, these devices are very expensive, typically restricted to a particular device, complicated to use and extremely delicate.

One method of sharing electronic screen content with others is a digital projector. This product functions by importing the digital signal from the personal electronic device and transforming it to output a projected image onto a screen or flat surface which allows public viewing of the screen content.

While these electronic projection devices, either personal electronic glasses or digital projectors, are known, their application is extremely limited. Their principal drawbacks are: expense (typically in the $1000+ range), they typically require a separate A/C power connection, they are bulky to transport, and transferring the data from the personal electronic device to the projection device requires the proper ports on the respective devices, cables, and software that are all compatible. As a result, this category of projection device is not functional in many situations and is only used by those people who wish to expend the time, energy and money to utilize such complex systems.

Therefore, there is a need in the art for a relatively inexpensive, lightweight viewing enhancement device for personal electronic devices, for screen magnification, privacy, viewing enhancement and image projection.

SUMMARY OF THE INVENTION

The present invention provides a collapsible, lightweight, highly transportable and low cost viewing enhancement and projection device for attachment to a personal electronic device such as Portable Media Players (PMP), (e.g., IPOD®, ZUNE®, ZEN®, ZVUE®, etc.)

The invention relates to a magnification theater for a personal electronic device. The magnification theater includes a magnifying lens coupled to a pyramid-shaped body having a larger opening at a top end and a smaller opening at a bottom end, The magnifying lens is located in the larger opening and the smaller opening is configured to reside above and around a screen contained on a personal electronic device. The body forms a light shielding shroud between an image on the screen and the magnifying lens. The smaller opening is configured to be fitted around the screen on the personal electronic device and may be provided with structure for securing the body to the personal electronic device so as to releasably align the screen with the body for magnification by the magnifying lens.

The invention also provides a collapsible magnification theater that is highly transportable. In an exemplary embodiment, the magnification theater comprises a plurality of individual sections, each having a trapezoidal shape and defining a larger opening and a smaller opening, wherein the larger and smaller openings are rectangular in shape. Any one section may be configured to fit within a previous section and telescopically engage the previous section.

In another exemplary embodiment, the sections of the magnification theater comprise at least one groove or tooth in a wall of one section and a tab on a wall of an adjacent section, wherein the tab is configured to releasably engage the groove or tooth in a telescopically extended relationship.

In an exemplary embodiment, the magnifying lens is a Fresnel lens, optionally a plastic Fresnel lens.

In another exemplary embodiment, the invention provides a folded magnification theater. The body of the theater comprises a single piece of a folded material having four living hinges between a first edge and a second edge of the folded material. A tab located on the second edge engages a slot located near the first edge in order to secure the two edges and form a pyramid-shaped theater.

In another exemplary embodiment, the invention provides a projector adapted to mate with the magnification theater. The projector has a body with an opening adapted to align above the magnification lens of the theater. A magnifying lens is mounted within the projector body. The projector body positions the magnifying lens such that an image on a screen of a personal electronic device may be projected through the magnifying lenses onto a remote surface, such as a wall.

DETAILED DESCRIPTION OF THE INVENTION

As used herein a "Fresnel lens" means a lens designed for use in the 380 nm to 750 nm wavelength ranges (visible light) and having a set of concentric annular sections known as Fresnel zones, allowing the overall thickness of the lens to be decreased, for example, see U.S. Pat. No. 6,407,860, the entirety of which is incorporated by this reference.

The linear magnification (M) of a thin lens is $M=f\backslash(f-S)$, where f is the focal length and S is the distance from the lens to the object. For real images, M is negative and the image is inverted and for virtual images, M is positive and the image is upright. Additionally, this equation can be rewritten where $d_i$ is the image distance and $d_o$ is the object distance: $M=-d_i\backslash d_o$.

The angular magnification of a magnifying glass depends on the position of the magnifier and object, relative to the eye. When the front focal point of the lens is on the object being viewed, a relaxed eye (assuming a "near point" focal length of 25 cm) can view the image with an angular magnification (MA) of $MA=25\backslash f$, where f is the focal length of the lens in centimeters.

This invention utilizes a positive focal length Fresnel lens. In the geometry described herein the theater comprises a magnified virtual image formed behind the image that appears larger than the original screen. The projector to theater relationship results in the projection of a magnified real and inverted image onto a screen or other object.

Figure 1A:
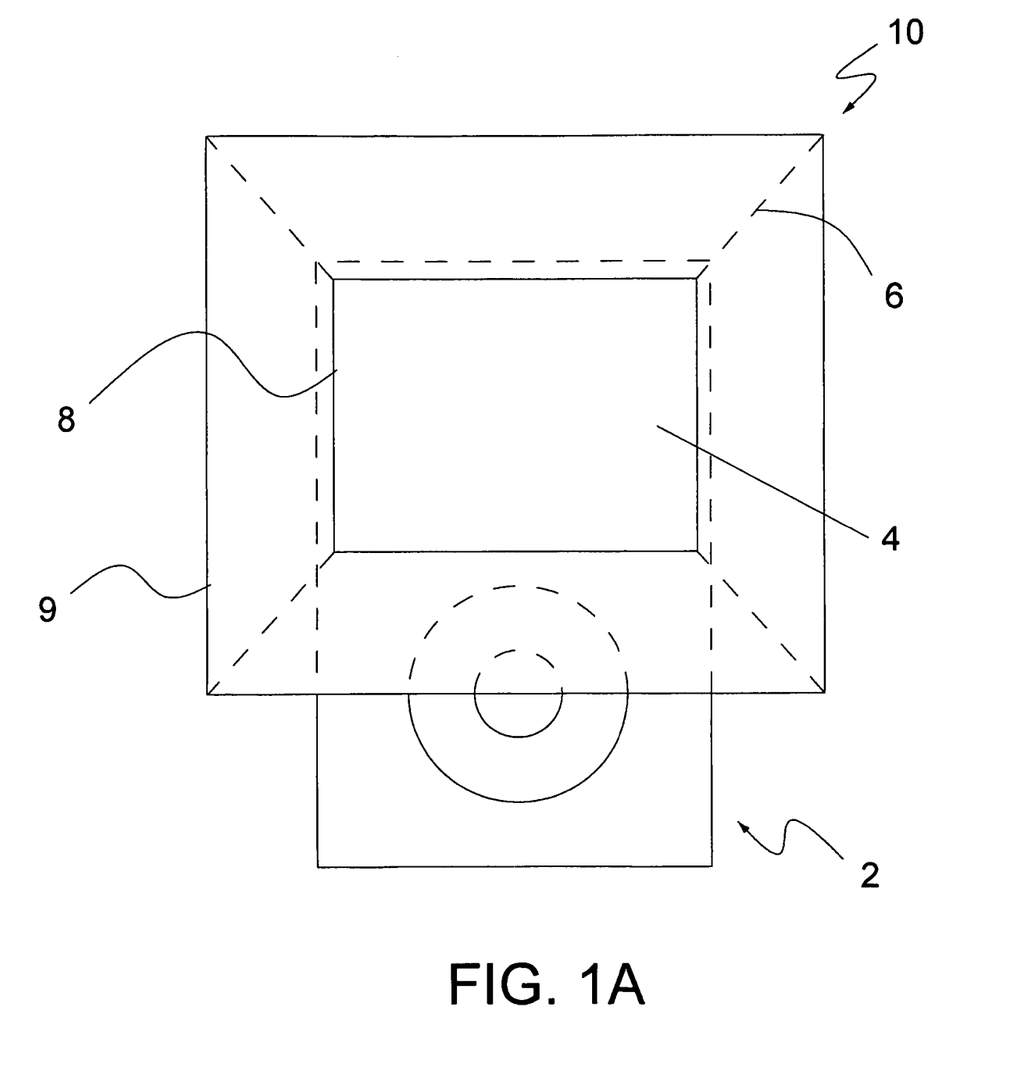
FIG. 1A is a front view of a personal electronic device having a screen with a magnifying theater according to the principles of the present invention coupled thereto.

As shown in FIG. 1A, the invention overcomes a number of limitations found in a personal electronic device 2. First, because of the desire to make such devices more portable, the size of such devices and thus the size of the screen 4 on the personal electronic device 2 is relatively small, which makes it difficult to see detail on the screen 4, when viewing a movie or other video content. Second, viewing on such a screen is not necessarily private (e.g., someone sitting next to the user of the personal electronic device 2 can easily see the screen 4 as well). Third, the screen 4 is usually difficult to see in bright or daylight environments where ambient light can cause the image on the screen 4 to appear washed out.

A viewing theater 10 of the present invention is designed to be portable and as easy to carry as the portable media player itself. The theater 10 provides a collapsible or foldable unit that has a small footprint size and easily fits into a purse, shirt pocket, or other container with minimal bulkiness and/or weight. Other advantages include, magnification 6 (as represented in dashed lines) of the target screen 4 from 0.5× to 4× or more without significant distortion of the video image, creation of a light controlled environment surrounding the screen that serves to diminish the effects of ambient light such as bright lighting or daylight viewing and allows viewing under otherwise difficult lighting circumstances, limiting the angle of view to the portable media player 2 user only so that anyone sitting next to the user can not see the portable media player screen 4 or the projected image, and low cost manufacturing to enable a broad consumer base. The theater 10 has a generally pyramidal shape defining a small opening 8 sized and shaped to surround the screen 4 and a large opening 9 spaced above the screen 4 a distance to provide a desired magnification according to the lens (not shown) employed, as will be described in more detail.

Recognizing the tremendous variations in colors, styles, sizes, and designs of portable media players in the market, the invention is easily fitted to each device without major modifications to the basic design. In addition, the invention may be customized to provide unique colors, patterns and sizes.

Figure 1B:
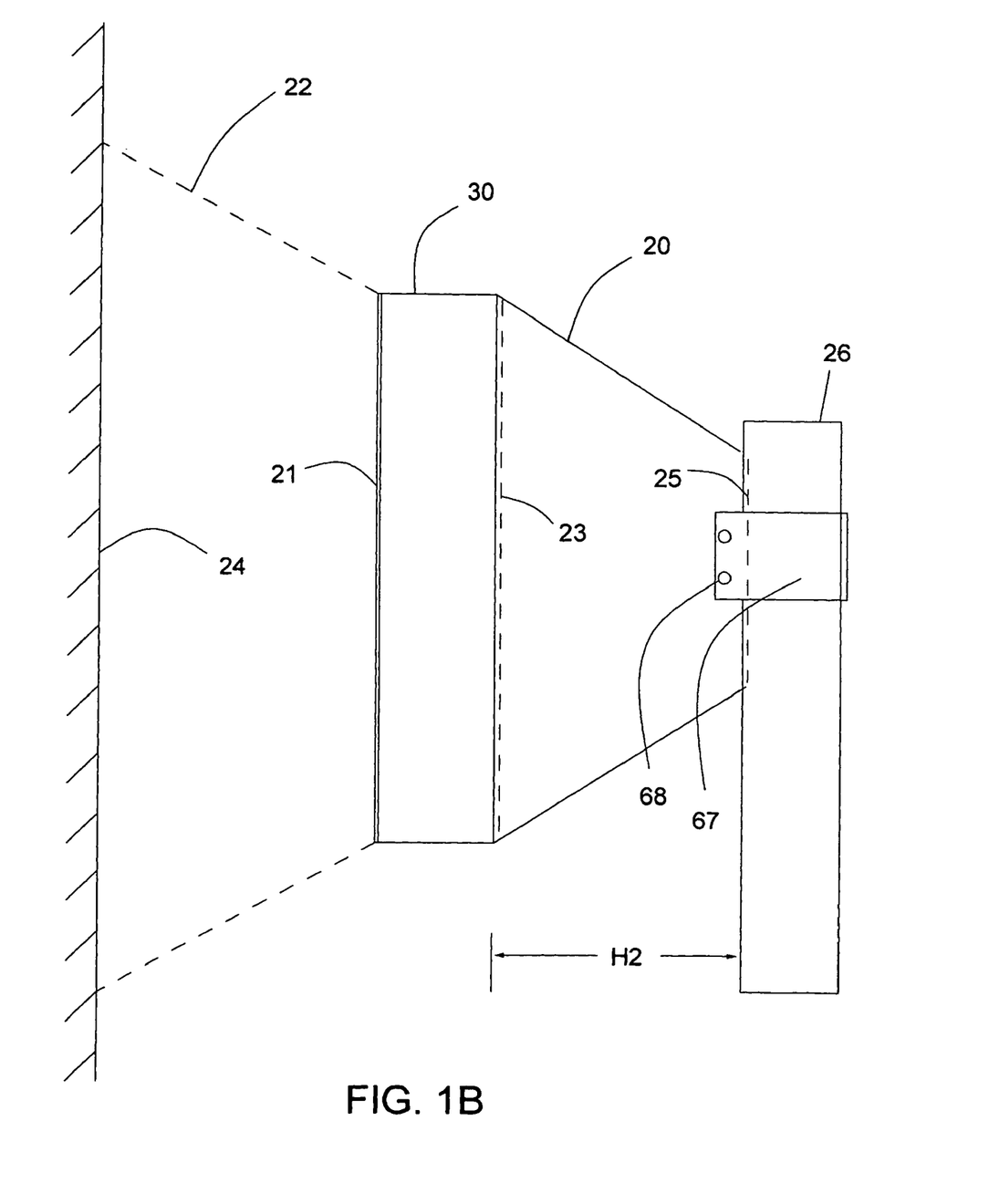
FIG. 1B is a side view of a personal electronic device with a magnifying theater and projector according to the principles of the present invention attached thereto.

Referring now to FIG. 1B, there is illustrated a theater 20 and an associated projector 30 according to the principles of the present invention. The theater 20 and projector 30 each weigh less than about 1 oz and may be formed of materials, such as plastic, such that the projector 30 and theater 20 weigh less than about 1/10th oz each. As such the theater 20 and projector 20 can easily be carried in a shirt pocket. In addition, the theater 20 and projector 30 may cost less than $1.00 each to produce and may be manufactured for less than $0.50 each. The theater 20 and projector 30 may be configured to adapt to all electronic devices to passively project an image 22 up to 5 ft onto a screen 24 or flat surface for public viewing of a personal electronic device 26. That is, using only the backlighting of the LCD screen of the device 26, the video image 22 can be projected onto another surface 24 employing the theater 20 and projector 30 of the present invention. It is further contemplated that the theater 20 and projector 30 may be separate components with the projector 22 adapted to be releasably attachable to the theater 20 or integrally formed as a single projection unit.

Referring now to FIG. 2, 3A, 3B and 4, the invention provides a lightweight and portable mechanical viewing structure or "theater" 100 and projector 120 for a personal media player with a backlit screen that allows better viewing of the screen and/or sharing of the screen's content with a group or for personal viewing of a larger projected image. An advantage of the projector 120 is that it does not require any internal or external power source, light source (other than the light from the screen of the personal media player) or cables. Finally, both the theater 100 and projector 120 provide a simple attachment and construction design that permits large-scale manufacturing and low cost production. The projector 120 is configured to mate with the top 111 of the theater 100 as by sliding (indicated by arrow A) the projector 120 onto the theater 100.

Figure 2:
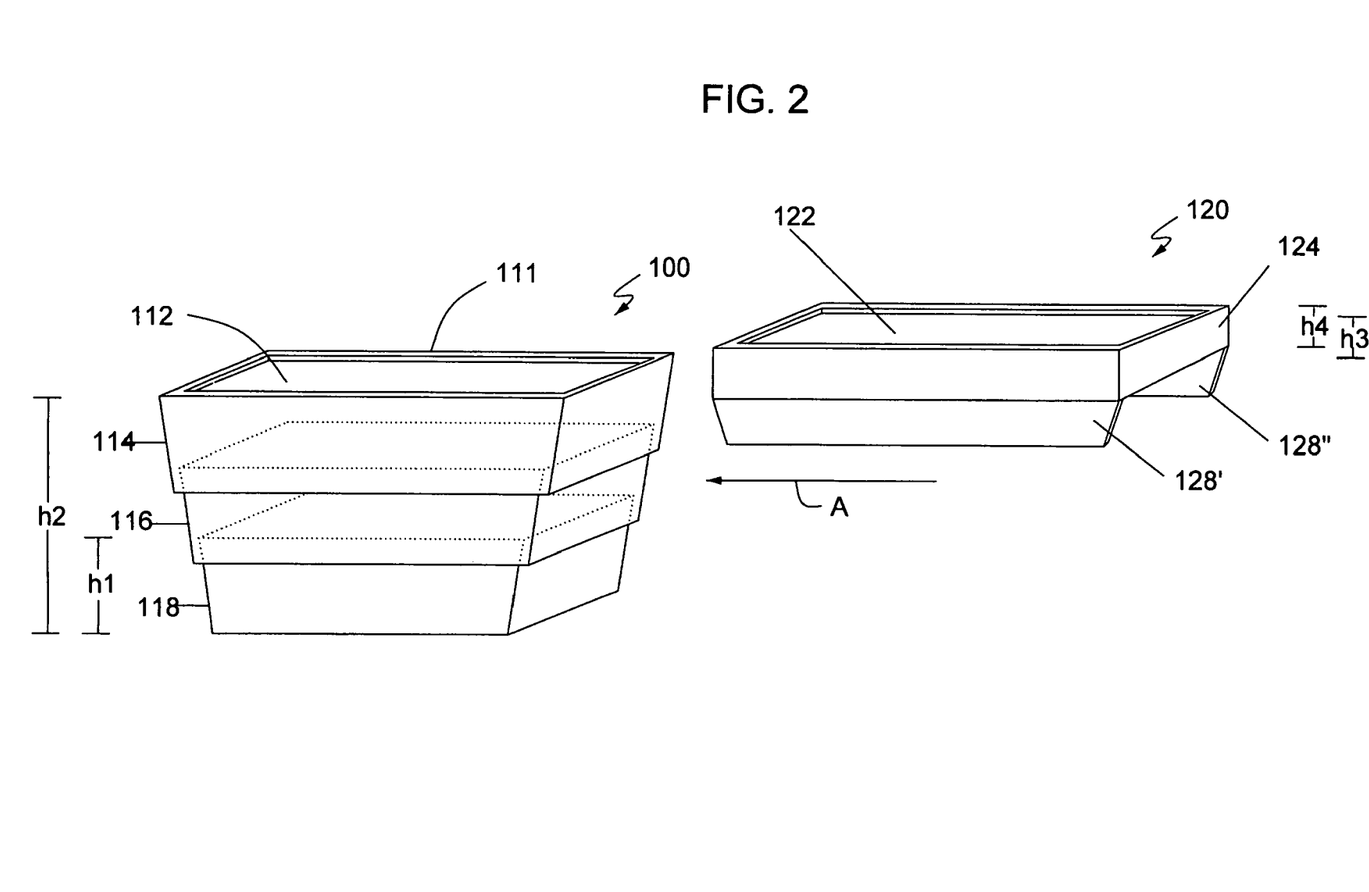
FIG. 2 is a side perspective view of an alternative embodiment of a theater and projector in accordance with the principles of the present invention.

The mechanical viewing structure or theater 100 comprises a plurality of trapezoidally shaped sections 114, 116 and 118, each formed from four semi-rigid trapezoid shaped walls (113 a-d) joined together to form a hollow trapezoidal section, such as section 116 (or inverted pyramid shaped structure). The plurality of sections 114, 116 and 118 are adapted to telescope out to form the theater 100 structure, which has a larger opening 102 defined by the top edge 104 of the largest section 114. The top 111 of the upper section 114 is fitted with a magnifying screen (or theater lens) 112. The lens 112 is fixedly mounted within the upper section 114. The lowermost section 118 defines a smaller opening 121 at the bottom 119 adapted to be placed above a video screen of a personal electronic device (not shown). Because most screens on these devices are square or rectangular, the theater 100 and projector 120 of the invention will likewise generally be configured with a square or rectangular shape. However, other shapes are also possible and the theater and projector would be configured to substantially match the general shape of the screen.

The theater 100 is configured to be collapsible, and includes three telescoping sections 114, 116, and 118. The magnifying lens 112 is attached to the top opening 111 of the top section 114. The middle section 116 is configured to reside within the top section 114 and telescope out to a predetermined or settable, distance. Likewise, a bottom section 118 is configured to reside within the middle section 116 and telescope out. Each section 114, 116 and 118 comprises an open or hollow trapezoidal shape, wherein the larger end of a section is configured to be restrained within the narrower end of a preceding section to form a telescoping trapezoidal configuration. By forming the side walls 113a-113d of a semi-rigid material, the side walls can flex relative to one another to allow tabs 132 and corresponding mating recesses 135 to engage and releasably interlock. Also, because of their semi-rigid construction, a biasing effect is created between engaging side walls so as to cause the tab 132 to be biased toward and within the recess 135 to hold the two mating sections together. In this embodiment, three sections 114, 116 and 118) are used to separate and rigidly hold the magnifying lens 112 from an object to be viewed, namely the screen. The magnifying lens 112 is a flat sheet magnifier, such as a Fresnel lens. Of course, those of skill in the art will appreciate that other lenses may be employed in accordance with the principles of the present invention.

Figure 3A:
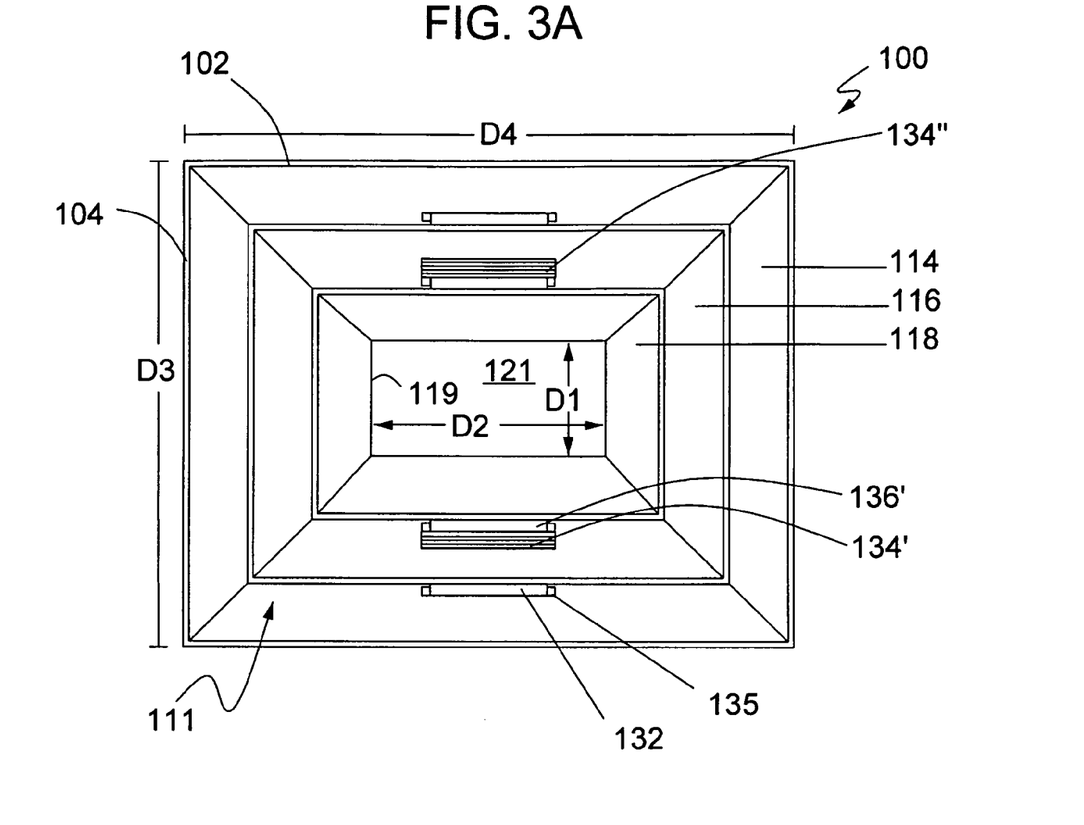
FIG. 3A is a top view of yet another embodiment of yet another embodiment of a theater in accordance with the principles of the present invention.
Figure 3B:
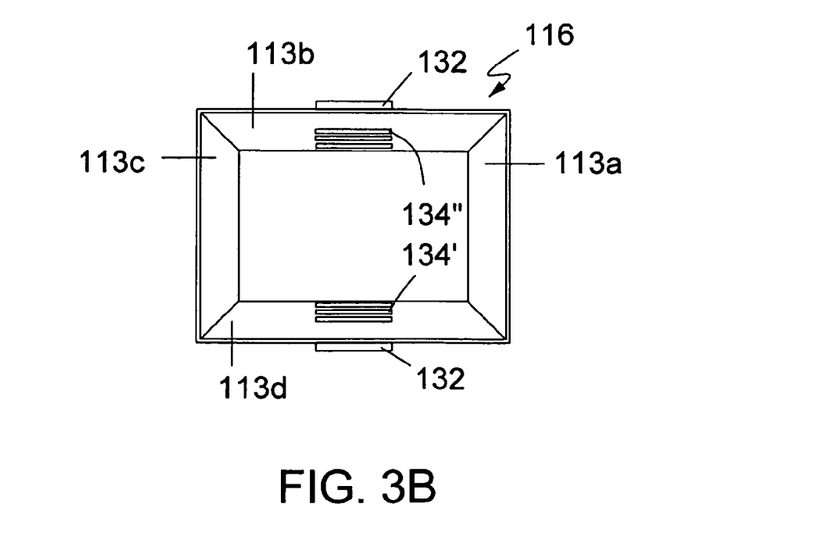
FIG. 3B is a top view of a section of the theater illustrated in FIG. 3A.

In order to provide adjustability of the overall height of the theater 100, one or more of the sections 114, 116 and 118 may be configured with a plurality of recesses or engaging ridges 134' and 134" for engaging with projections or tabs 136' and 136" at various relative positions, respectively, of a corresponding mating section. As such, rather than each section being coupled together at set, discrete locations, the sections 114, 116 and 118 can be adjusted relative to each other in order to change the overall height of the theater 100 and thus the distance of the screen to the lese 112. This becomes important when employing the use of the projector 120 in order to allow for various projector to viewing surface distances for focusing of the image on the viewing surface.

The individual sections 114, 116 and 118 may be of any height ($h_1$) and there may be any number of sections. The height ($h_2$) of the theater 100 is determined by the number of sections 114, 116 and 118 and the height of each section. Therefore, the desired distance between the screen of an input device and the magnifying lens 112 may be set at any height ($h_2$) by varying the number of sections and the height ($h_1$) of one or more sections. While the invention is described in terms of telescoping individual sections, the invention may also be made using a bellows style assembly, such as the bellows style assembly employed to form a collapsible cup, without separating the sections, so long as the plane of the theater lens 12 is positioned substantially parallel to the video device screen.

The bottom opening 120 of the theater 100 is adapted to be placed adjacent to a screen and is approximately the size of the video screen (see FIG. 1). Therefore, the bottom opening 120 is configured such that the width d1 and length d2 of the opening 120 are slightly larger than the target video screen. The theater may also be adapted to be removably fastened to the personal electronic device. In the case of the theater 100 built specifically for an Apple Video IPOD®, the bottom opening 120 of the theater 100 is approximately 1.75×2.3 inches (d1×d2).

In an exemplary embodiment, the larger top opening 111 has at least one side d3 or d4 that is approximately 3.1 inches in length. In another exemplary embodiment, the approximate height ($h_2$) of the trapezoidal shaped theater 100 is about 2 inches, about 2.25 inches, about 2.5 inches, about 2.75 inches, about 3 inches, about 3.25 inches, about 3.5 inches, about 3.75 inches, or about 4 inches. In another exemplary embodiment, the approximate height ($h_2$) of the trapezoidal shaped theater 100 is less than about 2 inches, less than about 2.25 inches, less than about 2.5 inches, less than about 2.75 inches, less than about 3 inches, less than about 3.25 inches, less than about 3.5, inches less than about 3.75 inches, or less than about 4 inches. In yet another exemplary embodiment, when the theater 100 is in its fully collapsed and transportable state it is approximately 3.5×4×0.5 inches (d3×d4×$h_1$). In another exemplary embodiment, the theater 100 comprises 1, 2, 3, 4, 5, 6, 7, 8, 9, 10, 11, 12, 13, or 14 sections, where each section may have a height $h_3$ of less than about 1 inch. In each instance, the relative ration between the size of d1 to d2 and d3 to d4 is dependent upon the ratio of the screen size. That is the ratios of sizes d1 to d2 and d3 to d4 will generally have the same size ratio as the screen (e.g., 16×9 for a "widescreen" or 4×3 for a "full screen").

In an exemplary embodiment, the extended theater 100 has a height ($h_2$) from the top opening 111 to a lower edge 119 of the bottom opening 120 of approximately 2.5 inches, a bottom opening 120 having internal measurements (D1×D2) of about 1.25 inches by 1.75 inches, and a top opening 11 having outside measurements of about 3.375 inches by about 2.875 inches (D3×D4). In yet another exemplary embodiment, when the theater 10 is in its fully collapsed and transportable state it is approximately 3.375×2.875×1 inch (D3×D4×$h_1$) and comprises three sections. The weight of the theater 100 may be between about 0.5 to 2.0 ounces.

Figure 4:
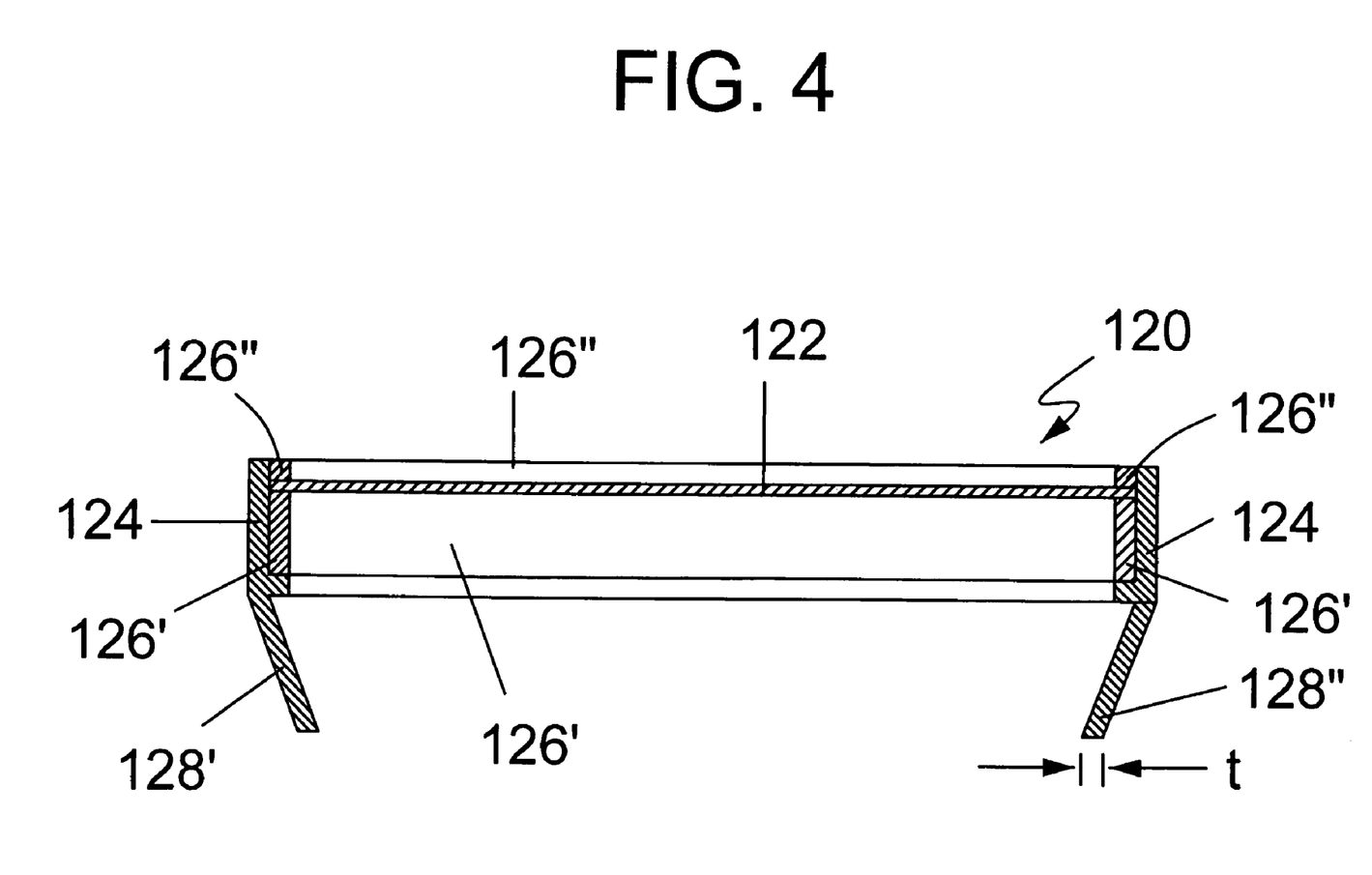
FIG. 4 is a cross-sectional side view of another embodiment of a projector in accordance with the principles of the present invention.

In order to provide the proper focusing of a projected image, the projector 120 is configured to relatively precisely position a projector lens 122 a predetermined distance $h_4$ from the theater lens 112. The projector lens 122 may be positioned approximately 0.5 to approximately 2.5 inches, approximately 0.3 to approximately 0.8 inches, or approximately 0.4 to approximately 0.6 inches away from the theater lens 112 ($h_4$). The side wall 124 forming the projector body provides the desired spacing between the two lenses 112 and 122 and is held in place relative to the theater 100 with mounting structures 128' and 128".

As further illustrated in FIG. 4, the projector 120 is comprised of: a four sided projector body 124; a flat lens 122, such as a Fresnel lens; perimeter mounting walls 126' and 126" comprised of foam rubber standoffs which hold the projector lens 122 in the projector body 124, and a mounting device, such as angled legs 128' and 128" that allows the projector 120 to be releasably attached to the theater 100. In the configuration illustrated in FIGS. 2 and 4 the side legs 128' and d 128" of the projector 120 are adapted to slide along the sides of the top section 114 of the theater 100. The legs 128' and 128" are inwardly angles to substantially match the angle of the side walls forming the top section 114 of the theater 100 and are spaced to form a friction fit with the top section 114 of the theater 100 thus allowing the projector 120 to be easily attached to and removed from the projector 100. The legs 128' and 128" align the magnifier lens 112 relative to the projector lens 122. Alternatively, the projector 120 may be attached to the theater 110 by other means, such as by use of elastic, Velcro, snaps, other friction fits as by sliding the projector 120 over the top section 114 of the theater 100 in a direction perpendicular to arrow A, and/or other means known in the art. Likewise, the projector 120 and theater 100 interface and theater 10 personal electronic device interface may include materials that increase the fasten strength, fill any gaps, cushion one or more components, or any other desirable function (e.g., including foam, foam rubber, rubber, fabric, or felt).

The theater 100 and projector 120 of the present invention may be made of a lightweight easily moldable material, such as a PVC or ABS based plastic material having a thickness t of approximately 0.001 inches to approximately 0.020 inches, approximately 0.050 inches to approximately 0.070 inches, approximately 0.010 inches to approximately 0.020 inches. In an exemplary embodiment, the plastic material is chosen so as to allow enough wall thickness t and stiffness to create a substantially solid structure once it is assembled as a theater 100 and/or theater/projector 120 combination.

Figure 5:
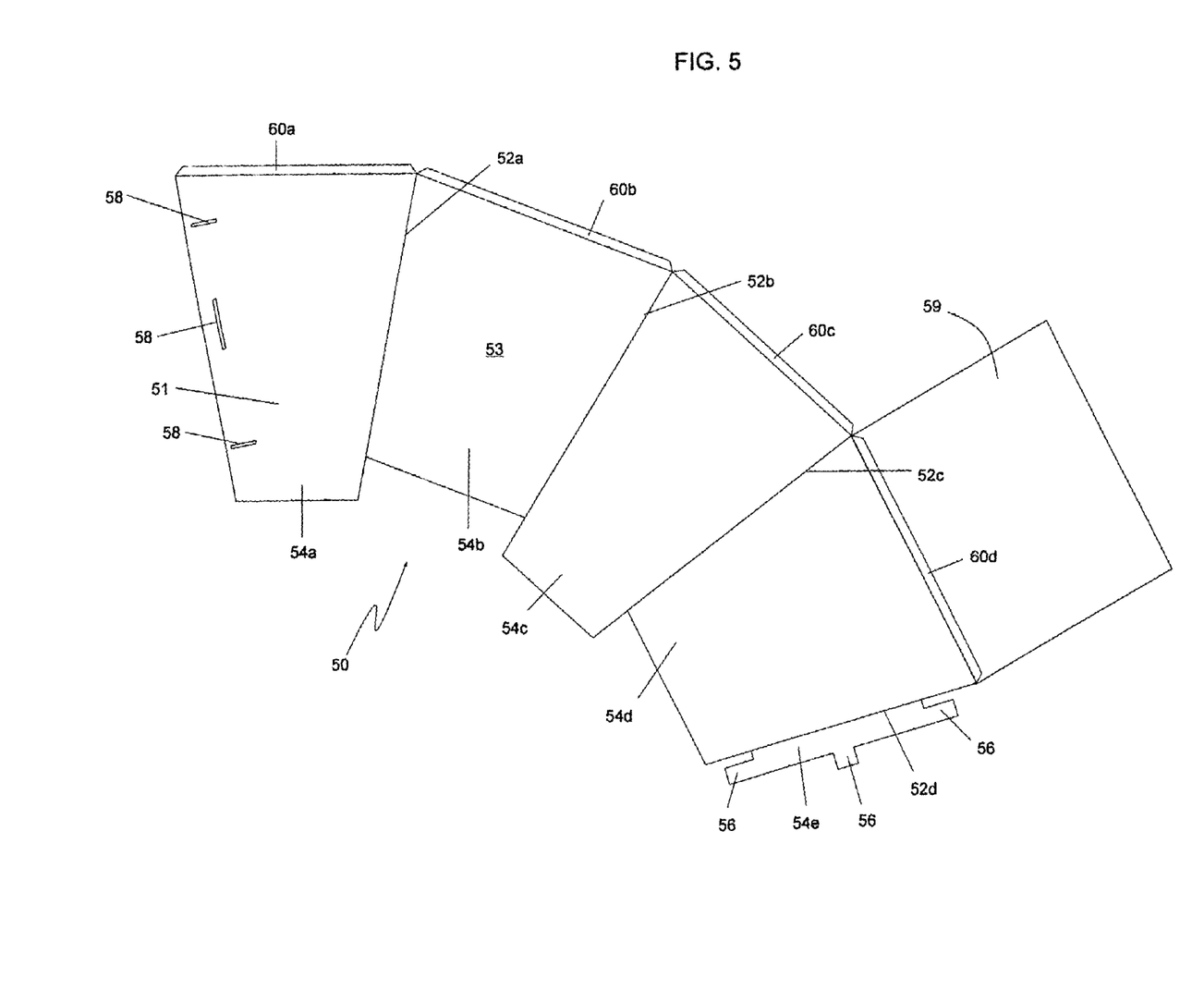
FIG. 5 is a side view of another embodiment of a theater in accordance with the principles of the present invention.

FIG. 5 illustrates another exemplary embodiment, where a plastic sheet is used to form a foldable theater, generally indicated at 50 and/or projector comprising one section 51 having hinges 52a-d, which may be a "living hinge," formed in a sheet 53 of material at the wall 54a-e junctions. The theater 50 can be assembled and collapsed repeatedly without material fatigue resulting failure at the living hinges 52a-d. A folding theater 50 may be formed by die cutting a sheet of plastic material approximately, for example, an 8.5×11 inch sheet of material. A lens 59 may be die cut from an appropriate plastic sheet of a Fresnel lens material designed for a specific viewing magnification and having an appropriate focal length. Once the viewing body section 51 is die cut, it is then scored at the hinge 52a-d lines and folded into a trapezoidal box shaped unit that may be secured as a theater 50 by inserting the tabs 56 into the securing tab slots 58. A Fresnel magnifying lens 59 may be attached to the theater 50 body by appropriate adhesive material, plastic rivets or other means known in the art. Likewise, upon assembling the theater 50, the lens may be held within the viewing end of the theater 50 by friction fit For example, the theater 50 may be die cut and a magnifying lens 59 of the appropriate size glued or riveted to a lens tab 60d to produce a theater 10 in a sheet form that may then be quickly folded into a functional theater 10. In another exemplary embodiment the Fresnel lens 59 snaps into place on the theater 51 body via lens tabs 60a-d attached to the side of the viewing lens and/or punched from the cut out of the lens. Another method of lens 59 attachment is to simply place the lens 59 over the viewing end of the theater and glue the lens 59 to the theater body 51. A projector according to the present invention may likewise be constructed as a folding projector. One advantage of a folding theater 51 and/or projector is the ease of shipping and storage, which allows for flat storage. Likewise, an end user may carry the device in the unassembled state without taking up much space in their luggage or pocket and quickly assemble the device on an airplane or other desirable location.

In yet another exemplary embodiment the theater 50 may be made of a vellum based PET film that allows direct printing on the inside surface of the theater 50 with a high gloss finish facing outside. This embodiment allows extremely high customization of the invention to each individual user in a cost effective way. The thickness of this vellum based PET film may be approximately 0.005 inches to approximately 0.010 inches.

The magnifying lens and projector lens of the present invention may be a plastic injection molded Fresnel lens that is capable of magnification from about 0.5× to about 5×. An exemplary plastic Fresnel lens having a magnification of about 3× may be approximately 0.020 inches thick.

In an exemplary embodiment, the theater and projector according to the present invention utilizes plastic Fresnel lenses, wherein the lenses may be made of a material such as acrylic, PMMA, polyvinyl chloride (PVC), polycarbonate (PC), Rigid vinyl or HDPE.

Optical quality acrylic is widely used for the production of visible light Fresnel lenses. Its transmittance is about 92% from the ultraviolet to the near infrared. Polycarbonate is spectrally similar to acrylic, but has a higher impact resistance.

Figure 6:
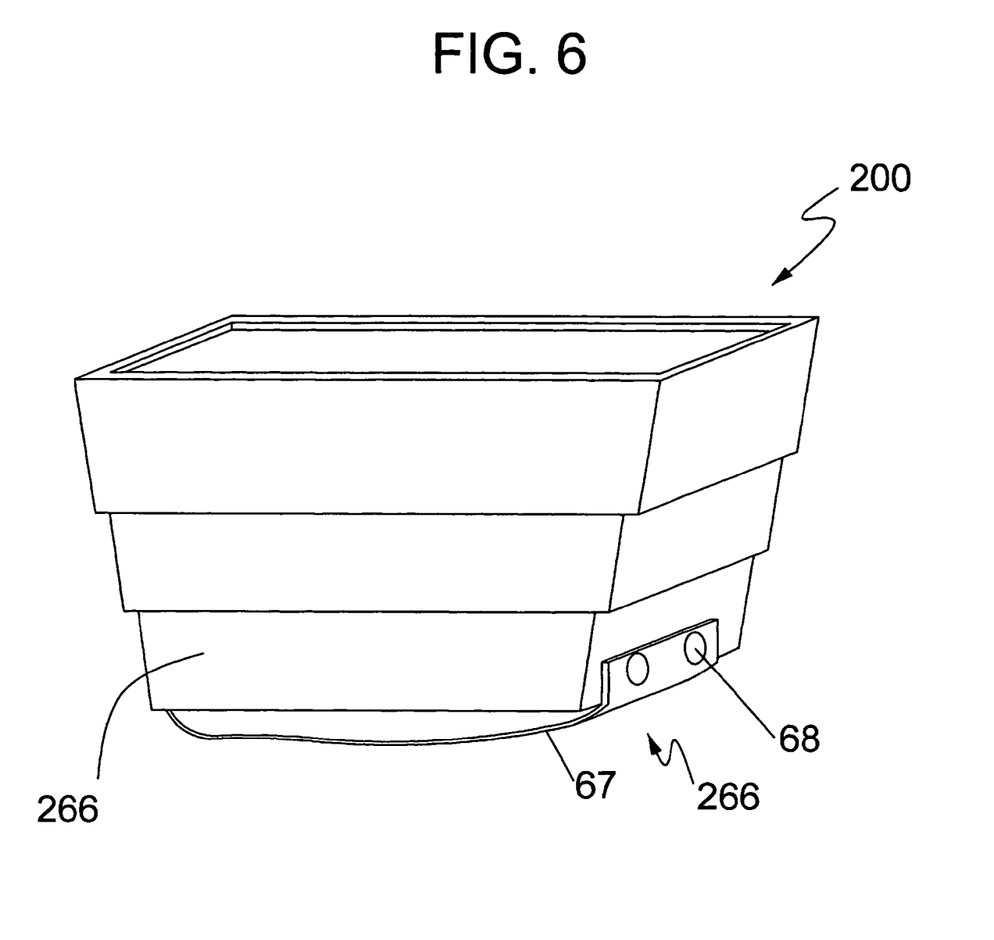
FIG. 6 is a side perspective view of yet another embodiment of a theater according to the principles of the present invention.
Figure 7:
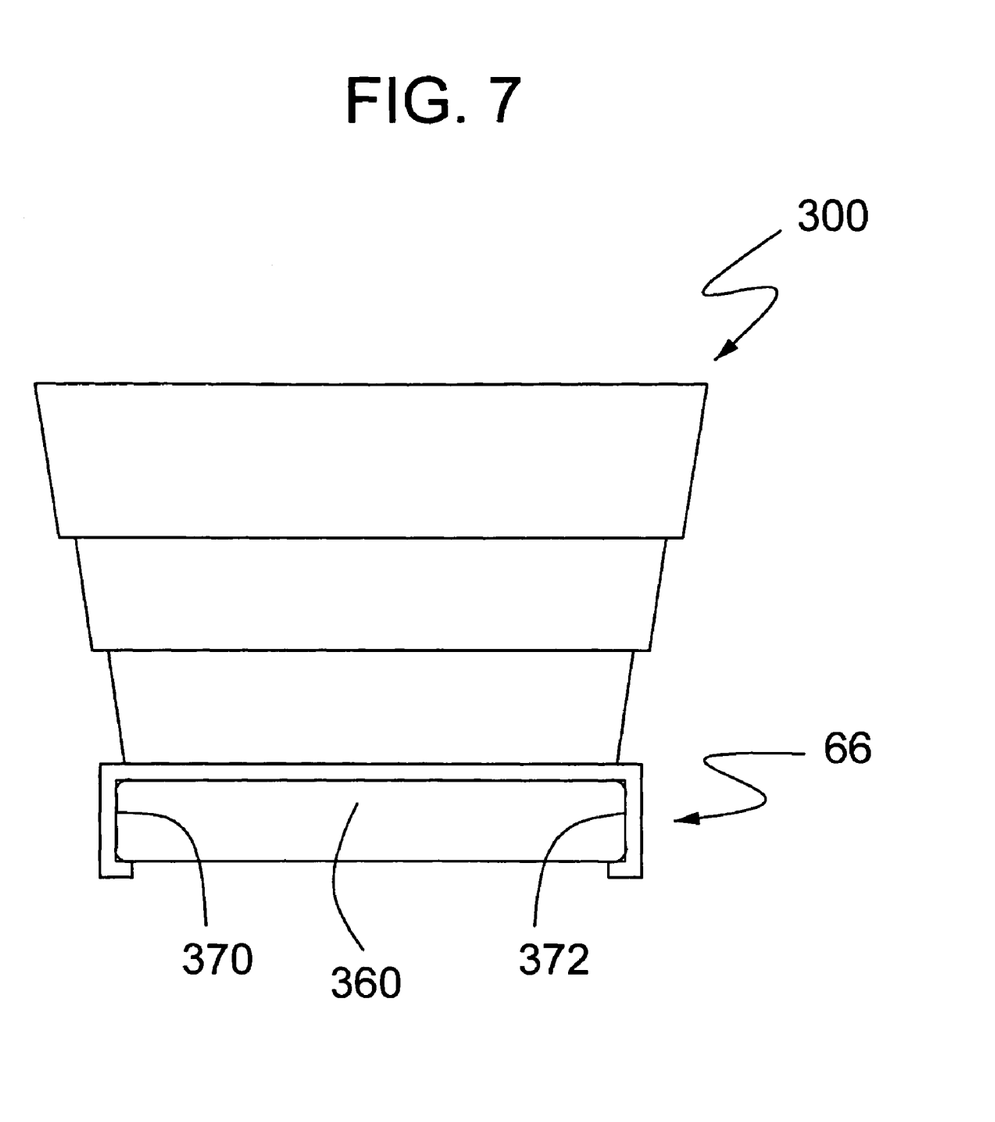
FIG. 7 is a side view of still another embodiment of a theater according to the principles of the present invention.

Referring now to FIG. 6, a personal electronic device (not shown) may be secured to a theater 200 by an attachment means 266, which may include, but is not limited to, Velcro material (not shown), an elastic material strap 267, which may be attached to the body 269 of the theater 200 with rivets 268, glued, or otherwise attached to the theater body 259. Likewise, as shown in FIG. 7, slidable engagement of a personal electronic device 360 into a pair of opposed channels 370 and 372 to removably attach the device 360 to the theater 300 may be utilized. Those of skill in the art will appreciate that various other means known in the art may be employed for attaching the theater 300 to a portable electronic device.

In an exemplary embodiment, a 4× Fresnel lens 12 and 22, having a characteristic focal length of 5.6 inches is used in the invention. An advantage to the use of a 4× lens for both the projector lens and the theater lens is that the overall theater height $h_2$ may be kept to a minimum while maximizing the viewing magnification. For example, if the distance from a personal electronic device to the theater Fresnel lens virtual image surface is set at 2.338 inches, a magnification of 1.67× is achieved (2.338 inches*4×/5.6 inches=1.67×). Stepping down to a 3× Fresnel lens magnification, the corresponding distance to achieve equivalent magnification must be increased to approximately 3.6 inches. Since an advantage provided by the present invention is the relatively small size of the theater and/or projector, both in the collapsed (unfolded) and assembled state, it is advantageous to avoid an overly tall or high ($h_2$) theater. Thus, a 4× lens, with a corresponding small theater height $h_2$ provides a highly desirable design advantage. Of course, a higher magnification lens has an increased sensitivity to the focus of the image when a projector lens is attached to the theater. Therefore, when constructing a theater according to the invention, it is useful to determine if the theater is going to be competent to mate with a projector of the invention.

In an exemplary embodiment where the theater is designed to be mated with a projector, focus of the projected image can be achieved in two ways: the first being adjusting the distance between the projector lens and the theater lens, for example, by adjusting the height ($h_4$) of the projector body, or second by adjusting the distance between the personal video device screen and the theater lens (height $h_2$) as shown in FIG. 3A and 3B. Adjustability of the projector height ($h_4$) can be achieved by allowing for adjustable mating of the mounting structure of the projector to the theater, such as with a tab and recess configuration similar to the tab/recess configuration of the interlocking section members of the theaters shown in FIGS. 3A and 3B.

It has been found that there is a nearly 3:1 advantage in achieving optimum focus of the projected image by adjustment of the distance between the video device screen and the theater lens (height $h_2$). In other words, the projector lens to theater lens distance is 3 times less sensitive to focusing than the video device screen to theater lens distance (height $h_2$). In other words, changing the distance $h_2$ between the personal electronic device screen and theater lens dramatically changes the focus and provides a method for fine tuning the focus, particularly the focus of the projector image.

When constructing a theater and/or projector device according to the invention, the distance $h_3$ between the projector lens and the theater lens (or the theater lens to the screen) can be set to yield a projected image that is in focus for a given projected image size at an optimum distance from the projector lens. However, if the user desires a larger or smaller projected image, or to vary the distance between the projector lens and the image viewing area, a loss in projected image focus may occur.

Figure 8:
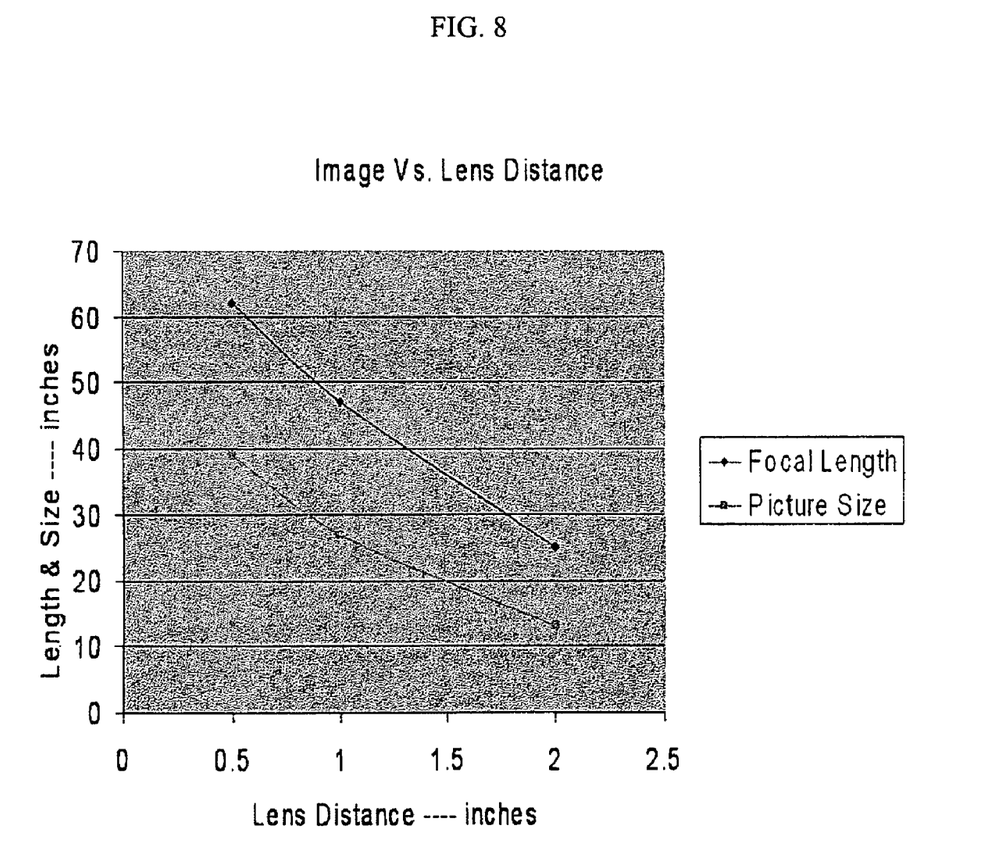
FIG. 8 is a graphical representation of image size to lens distance according to the principles of the present invention.

For example, referring again to FIG. 1B, a theater 20/projector 30 combination is designed to project an optimal viewing image at a distance of about 70.75 inches (about 6 feet), with a projected image size on a surface 24 of about 40 inches by about 30 inches. As shown in FIG. 8, as the distance between the lenses decreases, the image size of the projected image increases. To allow a user to watch a movie image projected from the projector lens 21 at a distance greater than or less than this distance, small adjustments in the theater 20 to screen distance $h_2$ (between the video device screen 25 and theater lens 23) allows for a larger or smaller projected image to be cast that will be in focus at the desired image size. Also, shrinking the projected image size allows the user to increase the brightness of the projected image and increase the resolution since image brightness and resolution is directly proportional to projected image size.

Therefore, as shown in FIGS. 3A and 3B, the invention also provides an adjustment mechanism. A number of mechanical mechanisms may be used with the invention to achieve this result. For example, a simple and low cost solution is to provide a series of small grooves or teeth 134' an 134" applied to one of the theater sections such as the middle 116 or top theater section 114, into which a tab 136' attached to section 116, and capable of interfacing with the individual grooves or teeth 134', can lock the two theater sections in multiple incremental positions. This allows the user to adjust the distance between the personal electronic device screen and the theater lens and to change the focus of an image projected from the projector. While the invention is illustrated by way of a series of grooves 134' and 134", a series of teeth may also be used. When the tab 136' of section 118 is fully engaged with the distal most groove or tooth 134' of section 116 the theater is said to be in the "factory" settings for the purpose of achieving optimum focus in typical viewing situations.

When the tab 136' of section 118 is engaged in a groove or tooth 134' (e.g., three grooves or teeth 134' other than the distal most groove or tooth 134') the focal length changes. For example, where the spacing between one groove or tooth 134' and the next is about 0.038 inches, the user may shortened the distance between personal video device screen and theater lens by three grooves or teeth 134' (3×0.038 inches per tooth or 0.114 inches). This may allow a larger projected image, or larger projector lens to screen distance, to be in focus In an exemplary embodiment, the spacing between the grooves or teeth 134' is about 0.038 inches with a series of seven grooves or teeth 134' allowing for a variable ($h_6$) spacing difference between personal video device screen and theater lens of about 0.266 inches. The result of this adjustment range allows a projected image size ranging between approximately 70×52 inches to approximately 15×11 inches at distances between the projector lens and screen from about three feet to about ten feet with the projected image in focus. As will now be apparent to the reader, the "factory" setting may be at any position within the grooves or teeth 134'.

In another exemplary embodiment, the top section 114 includes two sets of grooves or teeth 134' and 134" on opposing walls 13b and 13d wherein the number of grooves or teeth 134' may be 2, 3, 4, 5, 6, 7, 8, 9, 10, 11, 12, or any combination thereof (such as between three and eleven teeth, between four and ten teeth, between five and nine teeth, or between three and eight teeth).

In an exemplary embodiment the tabs 136' are approximately 0.75 inches×0.17 inches and 0.060 inches thick, protruding approximately 0.11 inches away from a theater section 116 top perimeter. The tab 136' may be plastic and/or may have a metal insert approximately 0.35×0.19 inches with a thickness of 0.030. A metal insert may be recessed into the plastic tab 136' so that its top surface is flush with the plastic tab 134' surface. This allows the metal insert of the tab 136' to engage individual teeth 134' in a firm position while adjusting the focus and the plastic tab 136' to engage a groove 134', thereby providing a tactile distinction between the fully extended state and lesser extension states. The tab 136' may be glued in position or molded as an integral part of a theater section 116.

The distances between the personal video device screen and theater lens and distance between the theater lens and projector lens may be factory set to accommodate a majority of consumer viewer situations. Thus, the person of ordinary skill in the art, in light of the present disclosure, will understand that optimum consumer viewing environments may be built for each particular personal media device or may be set for a particular class or subclass of personal media devices.

EXAMPLE I

A theater designed for an Ipod Nano or a classic Ipod may have the following dimensions:

| Theater Dimensions for Ipod Nano | | | | |
|---|---|---|---|---|
| | (dimensions in inches) | | | |
| Material: | | ABS Plastic | | |
| Material Thickness: | | 0.06 | | |
| Section Angle: | | 12.6 degrees | | |
| Panel Height | | 1 | | |
| | Top Length | Top Width | Bottom Length | Bottom Width |
| Section 14 | 3.295 | 2.800 | 2.859 | 2.364 |
| Section 16 | 2.808 | 2.313 | 2.372 | 1.877 |
| Section 18 | 2.321 | 1.826 | 1.885 | 1.390 |
| Projector | 3.426 | 2.931 | | |
| iPod Nano dimensions: | | | | |
| | | Length | | Width |
| Window | | 1.768 | | 1.273 |
| iPod Width | | 2.062 | | |
| Top-Window | | 0.911 | | |
| Thickness | | 0.265 | | |

| Theater Dimensions for Ipod Classic | | | | |
|---|---|---|---|---|
| | | (dimensions in inches) | | |
| Material: | | ABS Plastic | | |
| Material Thickness: | | 0.06 | | |
| Section Angle: | | 9.37 degrees | | |
| Panel Height | | 1 | | |
| | Top Length | Top Width | Bottom Length | Bottom Width |
| Section 14 | 3.303 | 2.800 | 2.977 | 2.474 |
| Section 16 | 2.910 | 2.407 | 2.585 | 2.082 |
| Section 18 | 2.517 | 2.014 | 2.192 | 1.689 |
| Projector | 3.434 | 2.931 | | |
| iPod Classic dimensions: | | | | |
| | | Length | Width | |
| Window | | 2.075 | 1.572 | |
| iPod Width | | 2.437 | | |
| Top-Window | | 0.191 | | |
| Thickness | | 0.435 | | |

In light of the descriptions contained herein, theater and projector designs for any device may now be easily calculated using the screen dimensions of the target device and, optionally, the thickness of the device. The overall height of a theater constructed for another device, such as a ZUNE, may remain fixed according to the above table so as to maintain the distance between the theater lens and device screen.

All references, including publications, patents, and patent applications, cited herein are hereby incorporated by reference to the same extent as if each reference were individually and specifically indicated to be incorporated by reference and were set forth in its entirety herein.

While this invention has been described in certain embodiments, the present invention can be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains and which fall within the limits of the appended claims.

What is claimed is:

1. A viewing enhancement apparatus for magnifying a display screen of a personal electronic device, wherein the viewing enhancement apparatus comprises:
a first magnifying lens;
a pyramid shaped body having a larger opening at a top end and a smaller opening at a bottom end, wherein the first magnifying lens is connected to and located in the larger opening and wherein the smaller opening is configured to reside above and around a display screen of the personal electronic device, and wherein the body spaces the first magnifying lens away from the display screen a sufficient distance to magnify an image on the display screen and focus the image for viewing through the first magnifying lens, and wherein the body forms a light shielding shroud between the image on the display screen and the first magnifying lens; and
at least one structure connected to the pyramid shaped body proximate the smaller opening configured to releasably align the screen on the personal electronic device with the smaller opening of the pyramid shaped body and the first magnifying lens.

2. The viewing enhancement apparatus of claim 1, wherein the body is collapsible.

3. The viewing enhancement apparatus of claim 2, comprising a plurality of individual sections, each having a trapezoidal shape, a larger opening and a smaller opening, wherein the larger and smaller opening is a rectangular shape.

4. The viewing enhancement apparatus of claim 3, wherein each section of the plurality of individual sections is configured to fit within a previous section and telescopically engage the previous section such that a larger end of each section is configured to be restrained within the narrower end of the preceding section to form a telescoping, trapezoidally-shaped body.

5. The viewing enhancement apparatus of claim 4, wherein the plastic comprises an ABS based plastic.

6. The viewing enhancement apparatus of claim 4, wherein the plurality of individual sections comprise a groove or tooth in one section and a tab in an adjacent section, wherein the tab is configured to releasably engage the groove or tooth in a telescopically extended relationship.

7. The viewing enhancement apparatus of claim 1, wherein the distance from the first magnifying lens to the smaller opening of the body is at least 0.5 inches.

8. The viewing enhancement apparatus of claim 6, wherein the plurality of individual sections comprises at least three plastic sections.

9. The viewing enhancement apparatus of claim 6, wherein the individual section connected to the first magnifying lens has a plurality of grooves or teeth.

10. The viewing enhancement apparatus of claim 3, wherein each individual section has a height of about one inch.

11. The viewing enhancement apparatus of claim 3, wherein the smaller opening is between about 1.4 and about 1.7 inches in width and between about 1.9 and 2.2 inches in length.

12. The magnification theater of claim 2, wherein the body has an extended height of approximately 3 inches.

13. The viewing enhancement apparatus of claim 1, wherein the at least one structure comprises an elastic strap.

14. The viewing enhancement apparatus of claim 1, wherein the first magnifying lens is a Fresnel lens having a size that is larger than the display screen of a personal electronic device.

15. The viewing enhancement apparatus of claim 14, wherein the Fresnel lens has a magnification of 4×.

16. The viewing enhancement apparatus of claim 1, wherein the first magnifying lens is a Fresnel lens.

17. The viewing enhancement apparatus of claim 1, wherein the body comprises a single piece of a folded material having four living hinges between a first edge and a second edge of the folded material, wherein at least one tab located on the second edge engages at least one slot located near the first edge.

18. The viewing enhancement apparatus of claim 1, further comprising a projector having a second body with a first opening adapted to align above the first magnifying lens and a second opening having a second magnifying lens therein, where the second body positions the second magnifying lens such that an image from the screen on the personal electronic device may be projected through the first lens and second magnifying lens onto a remote surface.

19. The viewing enhancement apparatus of claim 18, wherein the projector comprises two vertically extending side walls adapted to slidably engage the top of the magnification theater body.

20. The viewing enhancement apparatus of claim 1, wherein the first magnifying lens is secured in the larger opening by a foam molding adhered to the theater body.

* * * * *